May 17, 1927.

H. V. LUDWICK 1,628,729

WORK HOLDING DEVICE FOR MULTIPLE SPINDLE DRILLS

Filed March 10, 1922    4 Sheets-Sheet 2

INVENTOR.
HERBERT V. LUDWICK.
BY
ATTORNEY.

May 17, 1927.

H. V. LUDWICK 1,628,729

WORK HOLDING DEVICE FOR MULTIPLE SPINDLE DRILLS

Filed March 10, 1922    4 Sheets-Sheet 4

INVENTOR.
HERBERT V. LUDWICK.
BY
ATTORNEY

Patented May 17, 1927.

1,628,729

UNITED STATES PATENT OFFICE.

HERBERT V. LUDWICK, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

WORK-HOLDING DEVICE FOR MULTIPLE-SPINDLE DRILLS.

Application filed March 10, 1922. Serial No. 542,535.

This invention relates to an improved work-holding device for multiple-spindle drills. The invention has to do, more particularly, with a fixture or work-holding device for use in drilling and counter-boring flanged hubs.

In the manufacture of certain types of wheels, for instance, disc wheels, the front hubs are each provided with a flange which has a number of holes therethrough, which holes have to be drilled and counter-bored. The rear hubs have similar flanges requiring drilling and counter-boring but they also have, in many cases, another flange which interferes with the seating of the hub on the table of the ordinary drill press. The main object of my invention is to provide a fixture or device for supporting such flanged hubs or similar work in the drill press, which fixture is applicable to and may be used with either front or rear hubs.

Another object of my invention is to provide a work support for a drill press which may be elevated so as to bring the work up to the table of the machine.

A further object of my invention is to provide means for carrying the work such as to permit work to be inserted in place very readily and quickly, in a lowered position, and elevated to the working position, the work being securely clamped and locked in the work-holder when the latter is elevated to the working position.

Another object of my invention is to provide a simple and efficient work-holding and supporting mechanism for use in drilling or counter-boring flanged hubs or work having similar characteristics.

Further objects, and objects relating to details and economies of construction and operation, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, in which:

In the drawings, the same reference numerals refer to the same parts throughout the several views and the sectional views are taken looking in the direction of the arrows at the ends of the section lines.

In general, my invention comprises a stand or pedestal on which a work support is guided for vertical movement. The work support carries the work, in this case the flanged hub. Suitable means may be provided on the pedestal to limit the upward movement of the work support, so that it may always be brought to a definite position with reference to the drills. In order to facilitate the introduction of double flanged hubs, or similar parts, into this work support, I may make the latter with a gate at the front side which swings open to permit the work to be positioned within the work support. This can only be done when the work-support is in a lowered position and, when the work-support is raised to working position, which can only be done when the gate is closed upon the flanged hub or other work, it is impossible to open the gate or separate the parts of the work support, so that the work is necessarily adequately supported and clamped in fixed position while the drills work upon it. Any adequate means may be provided for elevating the work support. In this case I provide a screw which is operated by a nut actuated by a suitable hand-wheel. This makes a very convenient device for elevating the work support but I contemplate the use of equivalent means as within the scope of my invention.

Figure 2:
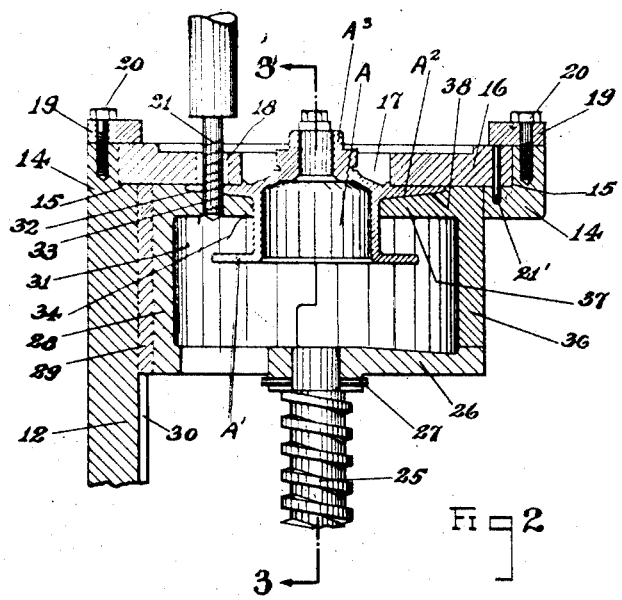
Fig. 2 is a vertical, sectional view through the work-holder, taken on the line 2—2 of Fig. 3.
Figure 4:
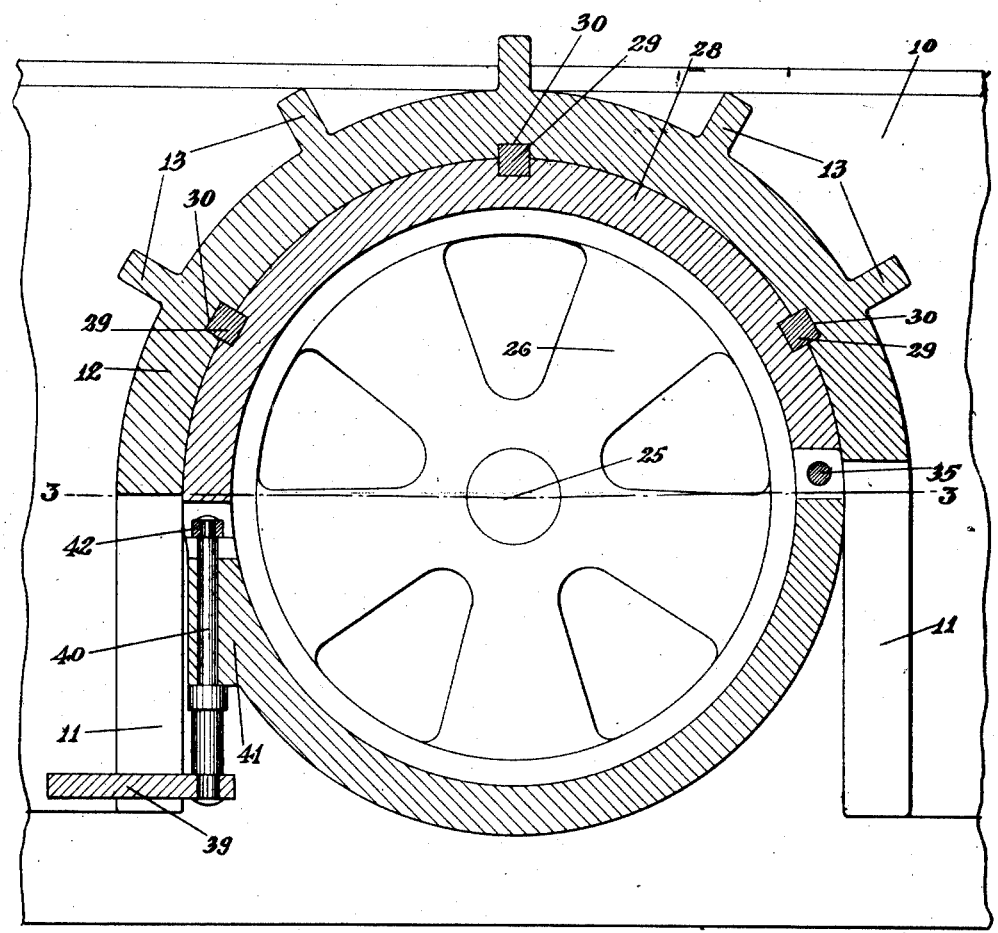
Fig. 4 is an enlarged, horizontal view through the pedestal and work-holder, taken on the line 4—4 of Fig. 1.
Figure 5:
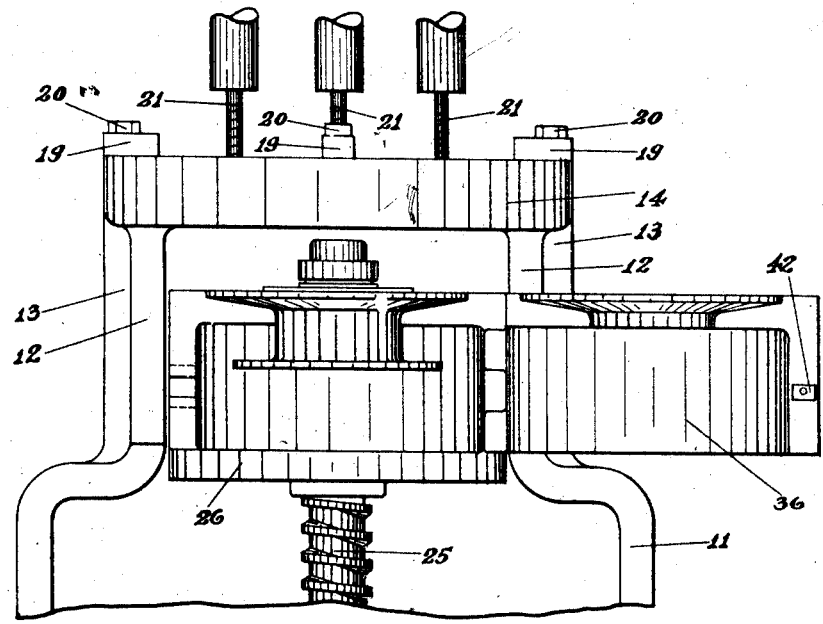
Fig. 5 is an elevational view corresponding to Fig. 1, but showing the work-holder lowered and open.
Figure 6:
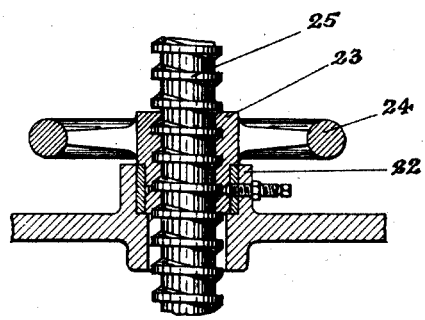
Fig. 6 is a detail, sectional view taken on line 6—6 of Fig. 1.

Referring to the numbered parts of the drawings, in which I have shown a preferred embodiment of my invention, the stand, 10, carries a pedestal, 11, the upper portion of which is formed into a curved, semi-cylindrical wall, 12, as shown in Fig. 4. This semi-cylindrical wall of the pedestal may be reinforced of strengthened by a plurality of vertically extending ribs, 13. The upper end of this wall, 12, supports an annular ledge, 14, having an annular seat, 15, to receive the periphery of the plate, 16, which closes the upper end of the pedestal. This plate or table, 16, has a central opening, 17, through which the hub may extend, and is provided with a plurality of openings, 18, arranged equidistant from the center of the plate and in alinement with the spindles of the drill press. The plate or table, 16, is removable and may be varied to suit the work and the number of holes to be drilled or counter-bored. It may be retained in place in the seat, 15, by means of the removable clamps, 19, which are secured to the pedestal by means of the bolts, 20. The dowel pin, 21, may be used to position the plate with reference to the pedestal, as shown in Fig. 2.

Figure 1:
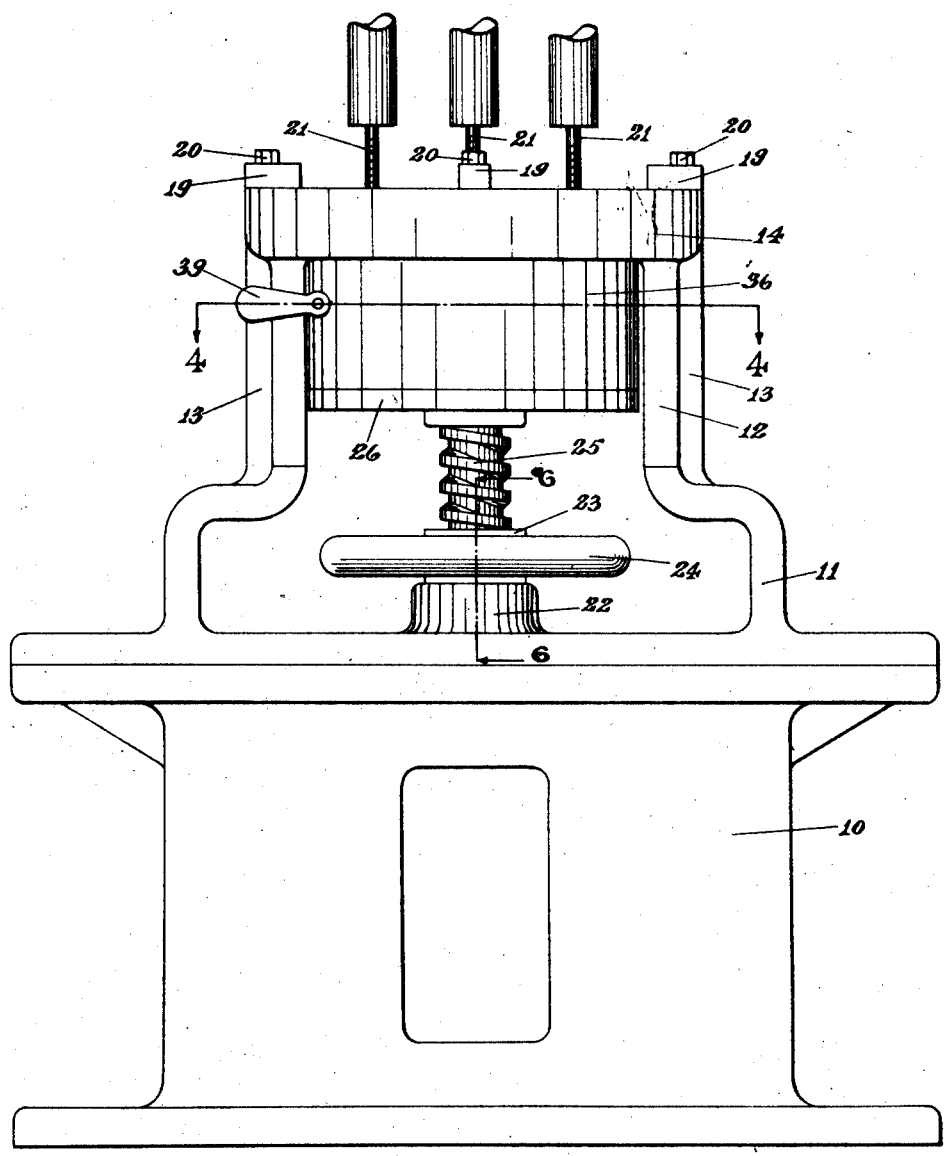
Fig. 1 is a view in front elevation of a machine embodying my invention.
Figure 3:
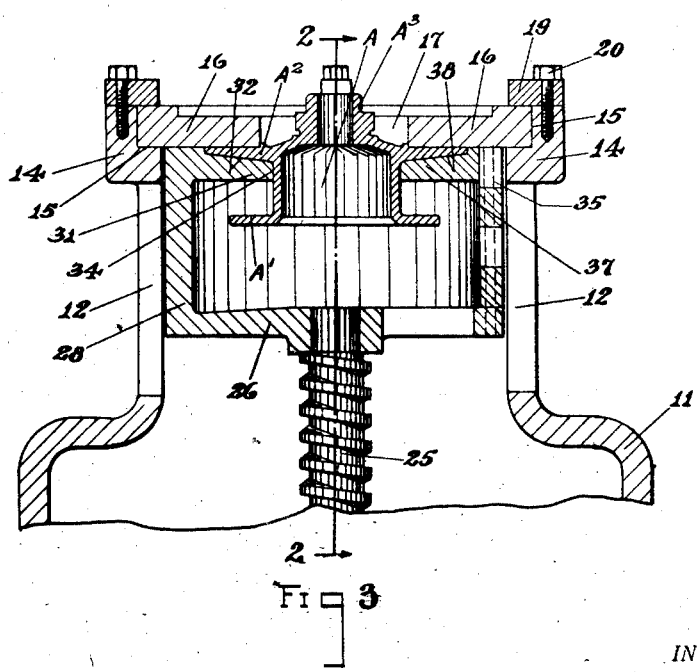
Fig. 3 is a vertical, sectional view, taken on the line 3—3 of Fig. 2.

This invention is particularly applicable to multiple spindle drills for boring or counter-boring a number of holes in a hub flange and, in Fig. 1, I have shown several of the drill spindles, 21, of the type used in such multiple spindle drills. The lower portion of the pedestal, 11, is provided with a central boss, 22, in which is journaled a nut, 23, said nut being rotatable with reference to the boss, 22, but retained, in any suitable manner, against axial movement with respect to the boss. This nut, 23, is threaded on the screw, 25, and may be actuated by a hand wheel, 24. The work-supporting member has a base, 26, which is fastened to the upper end of the screw, 25, for instance, by means of the pin, 27. The work-supporting member has a semi-cylindrical wall, 28, which rises from the edge of the base, 26, and carries a plurality of keys, 29, which slide in vertical guide-ways, 30, formed on the inside of the semi-cylindrical wall, 12, of the pedestal. In this manner, the work-supporting member is guided for vertical movement with respect to the pedestal. A semi-circular web, 31, extends from the upper edge of the semi-cylindrical wall, 28, and constitutes a part of the top of the work supporting member. The upper surface of this web is finished and inclined to correspond with the flange, $A^2$, of the hub, A, which, in practice, rests upon this surface, 32. The web may also be provided with a plurality of openings in line with the openings, 18, of the plate, 16, to permit the passage of the drills. The web, 31, is also provided with a central notch, 34, fitting the barrel of the hub, A. A gate is hinged to one side of the wall, 28, by the hinge, 35, and comprises a semi-cylindrical wall, 36, corresponding to the semi-cylindrical wall, 28, and a top web, 37, which corresponds to the web, 31. The upper surface of this web, 37, is finished, at 38, to correspond to the flange, $A^2$, of the hub and is similar to the surface, 32, of the fixed web, 31. This swinging gate may be locked to the fixed portion of the work support by means of a latch, 39, consisting of a shank, 40, journaled in the lug, 41, of the gate and terminating in a locking piece, 42, adapted to engage in a groove in the semi-cylindrical wall, 28, so as to lock the gate to said fixed wall. It will be seen that the work-support comprises a substantially hollow, cylindrical chamber having a central opening in its upper wall, through which the barrel of the hub, A, extends, and having its upper surface surrounding said central opening finished to correspond with the flange, $A^2$, of said hub so that the said flange will fit thereon. The flange, $A^1$, of the hub, and the greater portion of the barrel, is housed within the hollow, cylindrical chamber of the work-support. The work-support is raised and lowered by means of the screw, 25, and, in its raised position, the upper surface of the flange, $A^2$, is pressed against the lower surface of the plate or table, 16, so that the hub is securely held in position for the drills, passing through the openings, 18, of the plate, to bore the required holes in the flange, $A^2$. In order to facilitate the positioning of the hub, $A^1$, the work-support is made of two separable pieces, being provided with the swinging gate, 36. When the work-support is lowered, the latch, 39, may be manipulated to release the gate and the latter may be swung open so that the hub may be inserted laterally into the work support, to the position shown in Figs. 2 and 3. The gate may then be swung and locked in closed position and the hub will be accurately supported in the work-holder, since the surfaces, 32 and 38, thereof will engage the inner surface of the flange, $A^2$. The work support having been raised by manipulating the hand-wheel, 24, the portion, $A^3$, of the hub, projects through the central opening of the plate and the upper surface of the flange, $A^2$, is clamped by the work support against the lower surface of the drill plate, 16, as previously described.

This work-support may receive either front or rear hubs and supports them with equal accuracy for the drilling operation. It is a very simple matter to open the gate, withdraw the finished work and insert new work and the pitch of the screw, 25, is such that the work-support can be elevated to working position very quickly. When the work support is in the elevated position, the annular ledge, 14, surrounds the upper end thereof, as shown in Fig. 2, and it is impossible for the gate to come open so as to disturb the seating of the hub or work during the drilling operation.

I am aware that the apparatus, which I have illustrated and described here, may be changed considerably without departing from the spirit of my invention and, therefore, I claim my invention broadly, as indicated by the appended claims.

Having thus described my invention, what I claim as new and useful and desire to secure by Letters Patent is:

1. In a machine of the class described, the combination of a pedestal having one side open, a table supported by said pedestal, a work-holder slidably mounted on said pedestal, adapted to receive the work through said open side, means for clamping the work in said work-holder independently of said table, said clamping means being releasable when the holder is lowered away from the table, and means for moving the work-holder toward and away from said table.

2. In a machine of the class described, the combination of a frame having a work engaging portion, a work-holder slidably mounted thereon, a gate hinged to said work-holder and cooperating therewith to position and support the work, and means for bodily raising and lowering said work-holder in the frame to clamp the work against the work engaging portion of the frame.

3. In a machine of the class described, the combination of a frame having a work engaging portion, a work-holder slidably mounted thereon, a gate removably connected to said work-holder and cooperating therewith to position and support the work, and means for bodily raising and lowering the work-holder in the frame to clamp the work against the work engaging portion of the frame.

4. In a machine of the class described, the combination of a frame having a work engaging portion, a work-holder having a semi-cylindrical side wall slidably mounted thereon, a gate hinged to and forming a continuation of said wall and forming therewith a hollow chamber in which the work is received and supported, and means for bodily raising and lowering said work-holder in the frame to clamp the work against the work engaging portion of the frame.

5. In a machine of the class described, the combination of a frame having a work engaging portion, a work-holder slidably mounted thereon and comprising a body portion having a top wall shaped to form a seat for a part of the work to be operated upon and a gate hinged to said body portion and also provided with a top wall shaped to form a seat for a part of the work to be operated upon, said body portion and gate forming, in closed position, a hollow chamber receiving and supporting the work, and means for raising and lowering said work-holder in the frame to clamp the work against the work engaging portion of the frame.

6. In a machine of the class described, the combination of a frame having a work engaging portion, a work-holder slidably mounted thereon and comprising a portion having a semi-cylindrical side wall and a top wall shaped to form a seat for a part of the work to be operated upon and a gate hinged to said side wall and cooperating therewith to form a hollow chamber receiving the other part of the work, said gate having a top wall shaped to form a seat for a part of the work to be operated upon, and means for raising and lowering said work-holder in the frame to clamp the work against the work engaging portion of the frame.

7. In a machine of the class described, the combination of a pedestal having an open front, a work-holder slidably mounted on said pedestal, a gate hinged to said work-holder and adapted to be swung open through the open front of the pedestal to permit insertion of work therein, said pedestal having a portion connecting the sides thereof above the open front which engages said gate in the upper position of the work-holder to prevent the opening of the gate when the work-holder is raised, and means for raising and lowering said work-holder.

8. In a machine of the class described, the combination of a pedestal having an open front and a portion connecting the sides of said pedestal above the open front, a table carried by said pedestal and provided with a plurality of openings for the passage of drill spindles, a work-holder, slidably mounted on said pedestal, a gate hinged to said work-holder and adapted to swing open through the open front of said pedestal to permit the insertion of the work, said gate being engaged by the portion of the pedestal above the open front to prevent the opening thereof when the work-holder is raised against said table, and means for raising and lowering said work-holder.

9. In a device of the class described, a fixed support, a work holder movably mounted on said support, a part of said work holder being movable relative to another part to permit the positioning of the work on the holder, and means for preventing relative movement of the work holder parts with the work in position thereon, said means being rendered operative or inoperative through relative movement of the work-holder and the support.

10. In a device of the class described, in combination, a fixed support, a work-holder movably mounted on said support, a gate forming part of said work-holder for securing the work therein; and means for preventing opening movement of said gate, said means being rendered operative and inoperative through relative movement of the work holder and the support.

11. In a device of the class described, in combination, a fixed support, a work-holder movable with respect to the support to operative or inoperative position, said work-support including as part thereof a gate, means to lock said gate in closed position, and additional means operative to prevent opening of the gate while the holder is in operative position.

12. In a device of the class described, in combination, an open-sided pedestal of substantially semi-circular cross-section having a work engaging portion, and a work-holder adapted to clamp the work against the work engaging portion, said work-holder comprising two complementary walls, one of said walls being slidably mounted in the curved portion of said pedestal and having hinged thereto the second of said walls, said latter wall being adapted to swing outwardly through the open side of said pedestal.

In testimony whereof, I affix my signature.

HERBERT V. LUDWICK.